(12) United States Patent
Bell

(10) Patent No.: US 6,994,055 B1
(45) Date of Patent: Feb. 7, 2006

(54) METHOD FOR MANUFACTURING AN ANIMAL TOY AND PRODUCT RESULTING THEREFROM

(76) Inventor: Malinda K. Bell, 23140 Donald, Eastpointe, MI (US) 48021

( * ) Notice: Subject to any disclaimer, the term of this patent is extended or adjusted under 35 U.S.C. 154(b) by 45 days.

(21) Appl. No.: 10/852,934

(22) Filed: May 25, 2004

Related U.S. Application Data

(63) Continuation-in-part of application No. 10/637,034, filed on Aug. 8, 2003, now abandoned.

(51) Int. Cl.
*A01K 29/00* (2006.01)
(52) U.S. Cl. ............... 119/709; 119/711; 222/478
(58) Field of Classification Search ......... 119/707, 119/709, 710, 711; 222/478; 239/33; 426/85
See application file for complete search history.

(56) References Cited

U.S. PATENT DOCUMENTS

| | | | | |
|---|---|---|---|---|
| 4,537,308 A | * | 8/1985 | Hollander, Jr. | 206/484 |
| 4,928,632 A | * | 5/1990 | Gordon | 119/709 |
| 4,986,451 A | * | 1/1991 | Lowe et al. | 99/323 |
| 6,899,059 B1 | * | 5/2005 | Crane et al. | 119/711 |

* cited by examiner

*Primary Examiner*—Robert P. Swiatek
(74) *Attorney, Agent, or Firm*—Ted Masters

(57) ABSTRACT

An animal toy includes a plastic drinking straw having a sealed first end, a sealed opposite second end, and an internal cavity. An animal attracting substance is disposed within the internal cavity. At least one hole is punched in the plastic drinking straw so that an aroma from the animal attracting substance seeps through the hole and attracts a small animal.

1 Claim, 2 Drawing Sheets

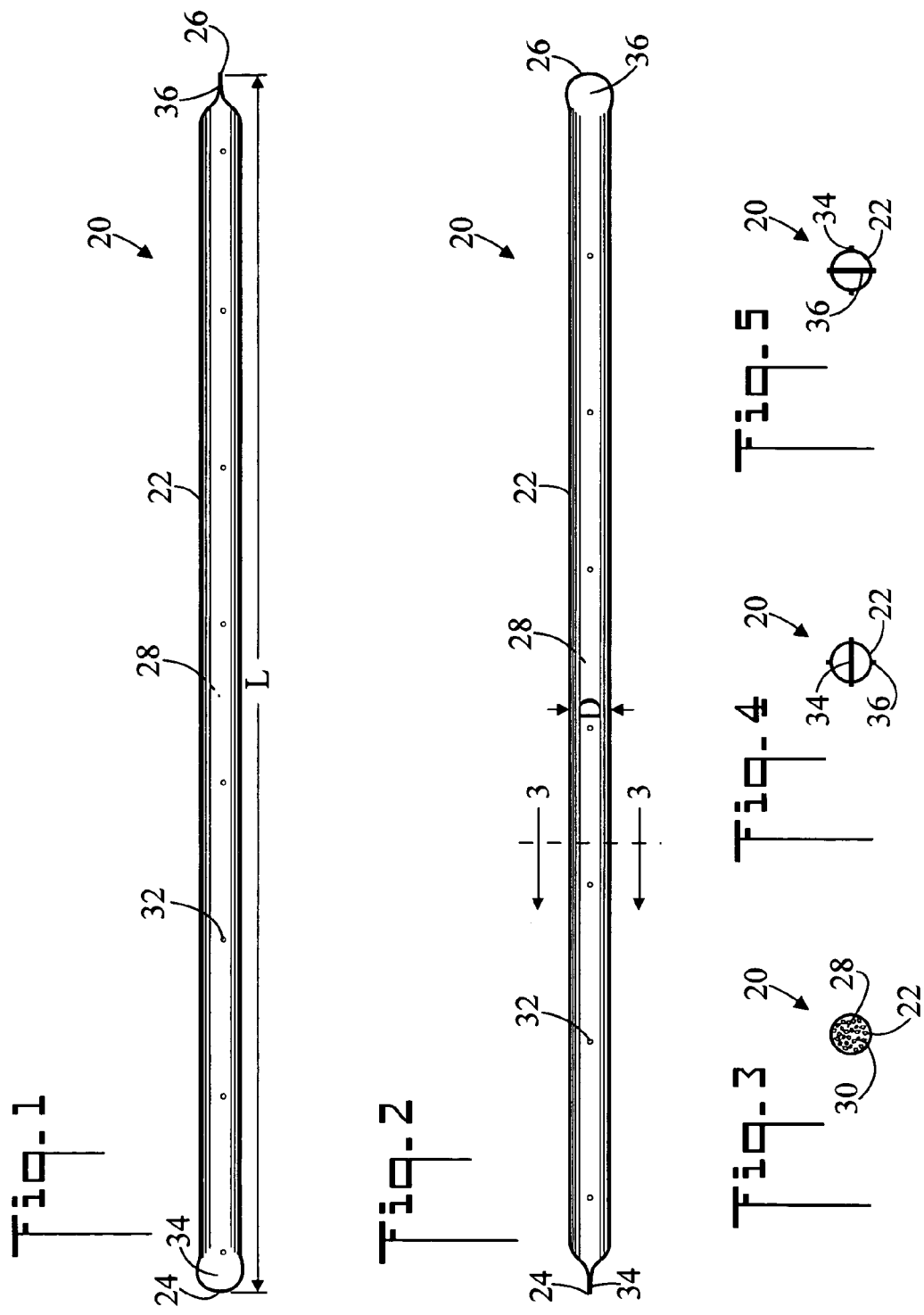

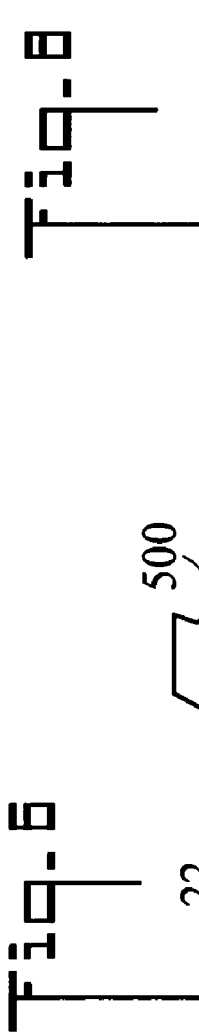
Fig. 8
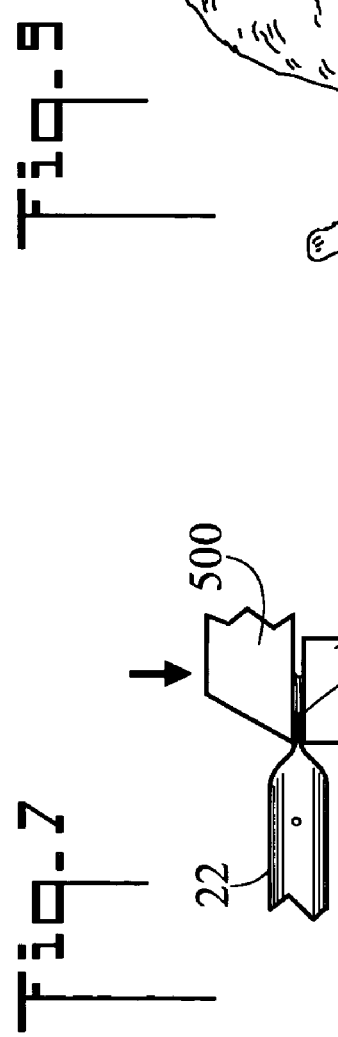
Fig. 6
Fig. 7
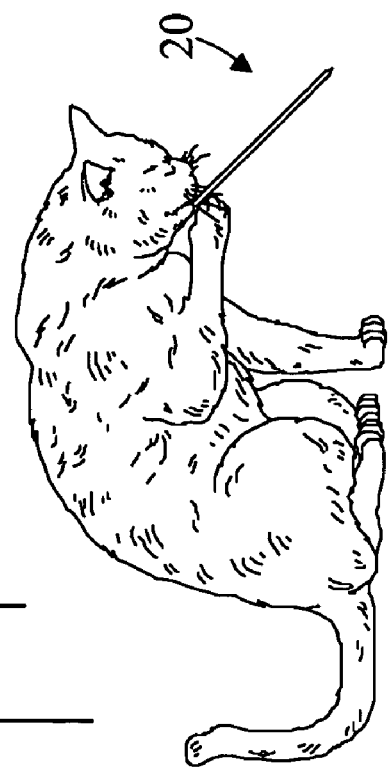
Fig. 9

METHOD FOR MANUFACTURING AN ANIMAL TOY AND PRODUCT RESULTING THEREFROM

CROSS REFERENCE TO RELATED APPLICATION

This application is a Continuation-In-Part and claims the filing priority of application Ser. No. 10/637,034, filed Aug. 8, 2003, ABN, which is included herein by reference.

TECHNICAL FIELD

The present invention pertains generally to toys for animals, and more particularly to a method for making an animal toy from a plastic drinking straw.

BACKGROUND OF THE INVENTION

Many pet owners buy toys for their animals to play with. The animal toys are typically chewed and batted about by the animal. For example U.S. Pat. No. 5,857,431 shows an animal chew toy having a shell made from a compressible material and has a plurality of openings formed therethrough. The chew toy has a hollow interior in which is disposed a quantity of dentifrice. When an animal chews the toy, dentifrice issues through the plurality of openings and encounters the teeth and gums of the animal. The shell may be wrapped with any suitable material to attract an animal, and may, likewise, contain a flavored or non-flavored odorant to attract an animal. Similarly, an odorant may be admixed with the dentifrice. If a wrapping is used, the wrapping has openings in communication with the openings in the shell to allow dentifrice to issue therethrough.

U.S. Pat. No. 5,191,856 illustrates a toy including a tube, releasably closed at both ends and by closure members placed under tension by a spring located in the tube and having disposed in the interior a material which exhibits a positive sensory attraction to an animal.

BRIEF SUMMARY OF THE INVENTION

The present invention is directed to a chew toy for cats, however the principles of the present invention could also be applied to other animals. The toy comprises an ordinary plastic drinking straw, such as that used to consume beverages from a glass, which is filled with an animal attracting substance such as catnip. The ends of the straw are pressed together by a heated source which melts the plastic, sealing the end openings, so the catnip cannot escape. Then, the sealed ends of the straw are trimmed in a rounded manner, so there are no sharp edges for the cat to chew on. Holes are pierced through the straw in such a manner as to allow enough catnip aroma to exude, but not so much that toy will separate plastic when the cat chews on the straw. Cats will also bat and play with the toy due to the catnip aroma. A cat will chew on the toy of the present invention rather than various other valuable items around the house. If cat happens to chew through the straw and eats the catnip, it is completely safe, as catnip helps aid digestion in cats when eaten.

The present invention is light weight (less than one ounce) and as such can be readily batted about by the cat. And, there is no need to replace the catnip in the straw since the present invention is disposable and is simply thrown away when used up. There are no springs, bells, hooks, sheet pads, bridge-like members or closure members or washer-like disks that can easily break, or break off, potentially presenting these dangerous items to a cat. Finally, the present invention also naturally excites the eye and sense of touch to a cat. A possible name for the present invention is "Nippy Stix".

In accordance with a preferred embodiment of the invention, a method for manufacturing an animal toy includes:
(a) providing a plastic drinking straw having a first end, an opposite second end, and an internal cavity;
(b) providing an animal attracting substance;
(c) sealing the first end of the plastic drinking straw;
(d) loading the animal attracting substance into the internal cavity;
(e) sealing the second end of the plastic drinking straw; and,
(f) punching at least one hole in the plastic drinking straw so that an aroma from the animal attracting substance seeps through the hole.

In accordance with an aspect of the invention:
in step (b), the animal attracting substance being catnip.
In accordance with another aspect of the invention:
in step (f), punching a plurality of holes in the plastic drinking straw, so that the aroma from the animal attracting substance seeps through the plurality of holes.
In accordance with another aspect of the invention:
providing a heat source;
in step (c), the sealing effected by using the heat source to compress and melt the first end thereby forming a first flattened portion; and,
in step (e), the sealing effected by using the heat source to compress and melt the second end thereby forming a second flattened portion.
In accordance with another aspect of the invention:
in step (e), ensuring that the second flattened portion is substantially perpendicular to the first flattened portion.
In accordance with another aspect of the invention:
providing a cutting tool;
after step (c), using the cutting tool to round the first flattened portion; and,
after step (e) using the cutting tool to round the second flattened portion.
In accordance with another aspect of the invention:
in steps (a) and (b), ensuring that the combined weight of the plastic drinking straw and the animal attracting substance is less than one ounce.
In accordance with another aspect of the invention:
in step (a), the plastic drinking straw having a length of about 7.75 inches and a diameter of about one-quarter inch.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a top plan view of an animal toy in accordance with the present invention;

FIG. 2 is a side elevation view of the animal toy;

FIG. 3 is a cross sectional view along the line 3—3 of FIG. 2;

FIG. 4 is an end view of the animal toy;

FIG. 5 is an opposite end view of the animal toy;

FIG. 6 is a side elevation view of the end of a plastic drinking straw and a heat source;

FIG. 7 is a side elevation view of the heat source sealing the end of the plastic drinking straw;

FIG. 8 is a side elevation view of second end; and,

FIG. 9 is a reduced perspective view of a cat playing with the animal toy.

DETAILED DESCRIPTION OF THE INVENTION

Referring initially to FIGS. 1 and 2, there are illustrated top plan and side elevation views respectively of an animal toy in accordance with the present invention, generally designated as 20. Animal toy 20 includes a tubular member. In the shown embodiment the tubular member is a conventional plastic drinking straw 22, having a sealed first end 24, a sealed opposite second end 26, and an internal cavity 28. In an embodiment of the invention, plastic drinking straw 22 has a length of about 7.75 inches and a diameter of about one-quarter inch, however other dimension are also possible. An animal attracting substance 30, such as catnip, is disposed within internal cavity 28. At least one hole 32 is punched in plastic drinking straw 22 so that an aroma from animal attracting substance 30 seeps through hole 32. In an embodiment of the invention, a plurality of holes 32 are punched in plastic drinking straw 22.

Sealed first end 24 includes a first flattened portion 34, and sealed second end 26 includes a second flattened portion 36. Second flattened portion 36 is oriented substantially perpendicular to first flattened portion 34. This unique feature results in animal toy 20 having four stable positions when it is laid upon a flat support surface. This causes animal toy 20 to roll in an a more interrupted manner than if first 34 and second 36 flattened portions were parallel to one another (refer also to FIG. 8 and the discussion pertaining thereto). In another embodiment of the invention, first 34 and second 36 flattened portions are rounded so that there are no sharp edges for an animal to chew on. And, in another embodiment of the invention animal toy weighs less than one ounce, so that when it is touched even lightly by an animal it will readily move.

FIG. 3 is a cross sectional view along the line 3—3 of FIG. 2. showing plastic drinking straw 22 and animal attracting substance 30 dispose within internal cavity 28.

FIG. 4 is an end view of animal toy 20 showing first flattened portion 34.

FIG. 5 is an opposite end view of animal toy 20 showing second flattened portion 36.

FIG. 6 is a side elevation view of second end 26 of plastic drinking straw 22 and a heat source 500. Plastic drinking straw 22 is sandwiched between heat source 500 and a support surface 700.

FIG. 7 is a side elevation view of heat source 500 sealing second end 26 of plastic drinking straw 22. The sealing is effected by using heat source 500 to compress and melt second end 26 and thereby form second flattened portion 36. In an embodiment of the invention heat source 500 can be a clothes iron, and aluminum foil can be used to protect the end of plastic straw 22 during the melting process.

FIG. 8 is a side elevation view of second end 26. Because second end 26 is fattened, it extends outside the diameter of plastic drinking straw 22. As such, when plastic drinking straw 22 is placed on a support surface 800, the extended portion of second end 26 will rest upon support surface 800. When plastic drinking straw 22 is rotated 90°, the extended portion of first end 24 will similarly rest upon support surface 800. This alternating action causes plastic drinking straw to roll in a more jerky manner therefore making it more entertaining to an animal.

FIG. 9 is a reduced perspective view of a cat playing with animal toy 20.

In terms of fabrication, a method for manufacturing an animal toy 20 includes:

(a) providing a plastic drinking straw 22 having a first end 24, an opposite second end 26, and an internal cavity 28;

(b) providing an animal attracting substance 30;

(c) sealing first end 24 of plastic drinking straw 22;

(d) loading animal attracting substance 30 into internal cavity 30;

(e) sealing second end 26 of plastic drinking straw 22; and, (f) punching at least one hole 32 in plastic drinking straw 22 so that an aroma from animal attracting substance 30 seeps through hole 32

The method further including:

in step (b), animal attracting substance 30 being catnip.

The method further including:

in step (f), using a pointed tool to punch a plurality of holes 32 in plastic drinking straw 22, so that the aroma from animal attracting substance 30 seeps through the plurality of holes 32.

The method further including:

providing a heat source 500;

in step (c), the sealing effected by using heat source 500 to compress and melt first end 24 thereby forming a first flattened portion 34; and, in step (e), the sealing effected by using heat source 500 to compress and melt second end 26 thereby forming a second flattened portion 36.

The method further including:

in step (e), ensuring that second flattened portion 36 is oriented substantially perpendicular to first flattened portion 34.

The method further including:

providing a cutting tool (such as a pair of scissors or a knife);

after step (c), using the cutting tool to round first flattened portion 34; and, after step (e) using the cutting tool to round second flattened portion 36.

The method further including:

in steps (a) and (b), ensuring that a combined weight of plastic drinking straw 22 and animal attracting substance 30 is less than one ounce.

The method further including:

in step (a), plastic drinking straw 22 having a length of about 7.75 inches and a diameter of about one-quarter inch.

It may be appreciated that animal toy 20 of the present invention may be fabricated using automated procedures to perform the end sealing operation, the animal attracting substance 30 loading operation, the hole punching operation, and the end rounding operation.

The preferred embodiments of the invention described herein are exemplary and numerous modifications, variations, and rearrangements can be readily envisioned to achieve an equivalent result, all of which are intended to be embraced within the scope of the appended claims.

I claim:

1. An animal toy, comprising:

a plastic drinking straw having a sealed first end, a sealed opposite second end, a diameter, and an internal cavity;

an animal attracting substance disposed within said internal cavity;

a plurality of holes punched in said plastic drinking straw so that an aroma from said animal attracting substance seeps through said plurality of holes;

said sealed first end including a first flattened portion;

said sealed second end including a second flattened portion, said second flattened portion having substantially the same area as said first flattened portion;

said first and second flattened portions being rounded and extending beyond said diameter;

said second flattened portion oriented substantially perpendicular to said first flattened portion, and;

wherein when said animal toy is rolled it rolls in a jerky manner thereby making it entertaining to an animal.

* * * * *